United States Patent [19]

Linde

[11] 4,424,857
[45] Jan. 10, 1984

[54] METHOD FOR REVERSING TWO REGENERATORS

[75] Inventor: Gerhard Linde, Gruenwald, Fed. Rep. of Germany

[73] Assignee: Linde Aktiengesellschaft, Wiesbaden, Fed. Rep. of Germany

[21] Appl. No.: 429,419

[22] Filed: Sep. 30, 1982

[30] Foreign Application Priority Data

Oct. 1, 1981 [DE] Fed. Rep. of Germany ....... 3139153

[51] Int. Cl.³ ............................................. F28D 17/00
[52] U.S. Cl. ......................................... 165/1; 165/5; 165/7
[58] Field of Search ............................. 165/4, 5, 7, 1

[56] References Cited

U.S. PATENT DOCUMENTS 2,121,733  6/1938  Cottrell ............................. 165/4 X
4,030,896  6/1977  Wimber et al. .................. 165/10 X
4,349,069  9/1982  Beck .................................. 165/7 X Primary Examiner—Albert W. Davis, Jr.
Attorney, Agent, or Firm—Millen & White

[57] ABSTRACT

To prevent disruptions in downstream processes due to non-uniform flows arising from the switching operation in two interchangeable regenerator systems, both the feed of a cold fluid to the cooled regenerator and the feed of a hot fluid to the heated regenerator are interrupted, the hot fluid is then introduced into the cooled regenerator while the cold fluid is first conducted through a heat accumulator connected in parallel with the regenerators; a portion of the fluid heated in the heat accumulator is fed into the heated regenerator to purge residual hot fluid therefrom and subsequently the cold fluid is passed in its entirety through the heated regenerator. Particular application is in preventing disruption in the flow, composition and temperature of air of combustion preheated by flue gas.

10 Claims, 1 Drawing Figure

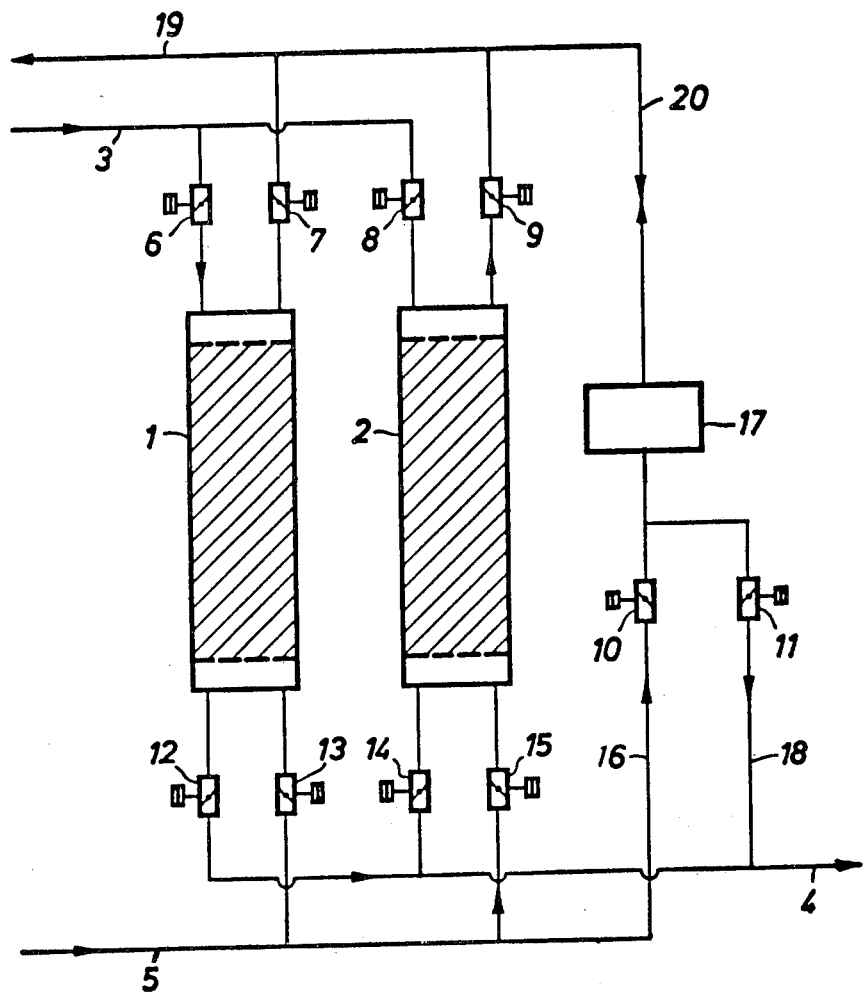

METHOD FOR REVERSING TWO REGENERATORS

BACKGROUND OF THE INVENTION

This invention relates to a method for the alternate reversing or switching of two reversible and interchangeable regenerators, one of which has been heated by a hot fluid and the other of which has been cooled by a cold, other fluid.

Conventionally, after reversal, cold fluid is introduced into the heated regenerator, and hot fluid is introduced into the cooled regenerator. The hot and cold fluids differ not only in their temperatures but also in their chemical compositions. During introduction of the cold fluid into the heated regenerator, the hot fluid still present therein is mixed with the other fluid and entrained by the latter. The chemical composition of the other fluid to be heated, therefore, is different, directly after reversing the regenerators, from the composition of the other fluid prior to introduction into the heated regenerator. This, however, is a disadvantage and can lead to considerable disturbances in the course of the subsequent process steps.

For example, when using regenerator pairs for the cooling of hot flue gas from a combustion zone associated with, e.g., boilers, furnaces or reactors, with the simultaneous heating of the air of combustion, when switching over from flue gas operation to air operation, flue gas is briefly returned to the combustion zone before the air has displaced the regenerator content of its residual flue gas. For a short time, therefore, a flue gas-air mixture is fed to the combustion zone; so for a finite time period, combustion is impaired due to a decreased oxygen concentration.

In the case of large boilers, several parallel regenerator pairs may be required for reasons of economics (for example 3 to 4 pairs of dual-stream regenerators in a 300 MW power plant with $10^6$ m$^3$/h of flue gases). By timing the switching of the individual pairs so that there is little or no overlapping, it is possible—combined with bypass regulation—to suppress the fluctuations of quantity of combustion air and oxygen concentration, with certain limits. However, when using an air bypass stream, cold air that has not been preheated is briefly conducted to the combustion stage. Thus, uniform combustion of the fuel is disrupted, and this constitutes a considerable disadvantage, especially in light of the fact that regenerators are cycled every few minutes.

SUMMARY

An object of this invention is to provide a method of the type discussed above wherein the switching operation does not cause any disruptions on the process steps, e.g., combustion, following the heating of the other fluid.

A particular object is to provide an improved combustion process wherein two reversible regenerators are employed to heat the air of combustion with heating values from combustion flue gas.

Upon further study of the specification and appended claims, further objects and advantages of this invention will become apparent to those skilled in the art.

These objects are attained according to the invention, by the improvement which comprises the steps of interrupting the feed of the cold fluid to the cooled regenerator and the feed of the hot fluid to the heated regenerator; switching valves so as to introduce the hot fluid into the cooled regenerator while simultaneously passing the cold fluid through a heat accumulator connected in parallel with the regenerators so as to obtain heated fluid; passing a minor portion of said heated fluid into the heated regenerator to flush out residual hot fluid therefrom; and subsequently passing the cold fluid in its entirety through the heated regenerator.

As contrasted with conventional interchangeable reversible regenerators, the heat accumulator is contacted by only the cold fluid in either its heated or ambient state. Thus, the heat accumulator is not subject to contamination. The heat accumulator can be a sheet metal tank filled with a heat retaining mass, for example with stones or ceramic material.

According to the invention, the cold fluid, when effecting reversal, is not immediately introduced into the heated regenerator but rather is conducted in a bypass around the regenerators and is heated during this step. The quantity of cold fluid, at least during the reversing step, is generally larger than the quantity required in the subsequent process steps. After heating the originally cold fluid in the heat accumulator, the excess amount is utilized, according to this invention, for purging residual hot fluid from the heated regenerator. Only after flushing out the heated regenerator is the cold fluid fed directly through the heated regenerator, rather than being conducted via the heat accumulator.

A major advantage of this invention is that it is possible to provide the heated cold fluid for further process steps, such as combustion in a steady state of flow, chemical composition, and temperature. Consequently, disruptions in operations downstream of the regenerators which were heretofore caused by the switching of the regenerators are practically entirely prevented.

Basically, the heat for the heat accumulator can be provided by any suitable heat source. According to a preferred embodiment of this invention, however, it is particularly advantageous to conduct a portion of the cold fluid, after having been heated in one of the regenerators, through the heat accumulator. This embodiment can be used especially expediently in all those cases when the heat capacity of the hot fluid is higher than that of the cold fluid. This is the case, for example, in the cooling of hot flue gases from combustion zones with the simultaneous heating of the air of combustion. Firstly, the amount of flue gas is practically always somewhat larger than the amount of air, namely due to contents of nitrogen, water, and oxygen molecularly bound in the fuel. Secondly, however, also the specific heat of the combustion products carbon dioxide and water is markedly higher than that of atmospheric oxygen.

Therefore, owing to this difference in heat capacities, it is always possible to conduct a greater amount of the originally cold air through the respectively heated regenerator than is actually required in the combustion step. With this excess proportion of air, the heat accumulator of this invention is heated up in the interval between two switching phases. Then during each switching phase, the heat accumulator is traversed by the entire quantity of incoming cold air—advantageously in the opposite direction. It is to be understood, moreover, that this embodiment of the invention is applicable to any system where the heat capacity of the hot fluid is greater than that of the cold fluid, thereby resulting in an excess of heated cold fluid.

In another embodiment of this invention, the portion of the fluid heated in the heat accumulator and serving to purge the regenerator is introduced at the warm end of the regenerator and withdrawn at the cold end thereof via the conduit used for withdrawing the cooled originally hot fluid from the regenerator.

In the case of heat recovery from flue gases, the latter are conducted into a stack after having been cooled in the regenerator. After reversal, air is introduced at the warm end of the regenerator so that the flue gas stored in the regenerator volume is displaced by air and this combination of flue gas and air is also conducted to the stack.

According to another preferred embodiment of the invention, the heat accumulator is made of such a size that its thermal capacity is just sufficient for heating the cold fluid during the reversing producure to the temperature exhibited by the heated cold fluid after flowing through a regenerator.

BRIEF DESCRIPTION OF DRAWING

The drawing is a schematic illustration of a preferred embodiment of the invention which is particularly adapted to the heating of air of combustion with flue gas.

DETAILED DESCRIPTION OF DRAWING

In the drawing, two regenerators 1, 2 are illustrated, serving to cool hot flue gas from a combustion zone with the simultaneous heating of air of combustion. Hot flue gas is introduced via a conduit 3 either into regenerator 2 by way of a valve 6 which can be a flapper valve or the like, or into regenerator 2 by way of a valve 8. The flue gas is discharged in the cooled condition from the respective regenerator via valves 12 and 14, respectively, and flows to a stack via a conduit 4. In the present example, the flue gas flows first through regenerator 1. In this case, air having an ambient temperature is conducted into regenerator 2 through conduit 5 via valve 15. This regenerator has been heated by flue gases in the preceding switching phase. After being heated in regenerator 2, the heated air is fed into the combustion zone, e.g., a furnace or boiler, via valve 9 and a conduit 19. Additional valves 7 and 8 at the warm regenerator ends and valves 13 and 14 at the cold regenerator ends serve to conduct the flue gases (via valves 8 and 14) and the air (via valves 7 and 13), respectively, in the subsequent switching phase. These valves, however, are initially closed. Since the amount of flue gas—as discussed above—is practically always somewhat larger than the amount of air, and since the specific heat of the combustion products, carbon dioxide and water, is markedly higher than that of atmospheric oxygen, it is possible to conduct a larger amount of air though a regenerator than corresponds to the flue gas quantity conducted through this regenerator during the preceding switching phase.

This means that it is not necessary to conduct the entire amount of air heated in regenerator 2 to the combustion zone, but that, rather, the excess proportion of hot air, which is usually about 1 to 10%, preferably 3 to 5% of the entire hot air, can be conducted via a conduit 20 to a heat accumulator 17. The heat accumulator is a sheet metal-tank filled with ceramic material for example with stones or ceramic material.

The hot air heats the heat accumulator 17. The air, cooled in heat accumulator 17, leaves the latter via a conduit 18 through valve 11 and enters the flue gas conduit 4 leading to the stack. A conduit 16 provided with a valve 10, the latter being initially closed in this embodiment, is branched between the heat accumulator 17 and the valve 11, and terminates in the air conduit 5.

Once regenerator 1 has been adequately heated by the flue gases and/or regenerator 2 has been extensively cooled by the air, switchover is effected. For this purpose, valves 6, 9, 11 and 15 are closed while valves 8, 10, 14 and 7 are opened. The flue gas now flows through regenerator 2 to the stack. The air, for the duration of the switchover procedure, does not flow through either of the two regenerators but rather is conducted via conduit 16 and valve 10 to the heat accumulator 17. The heat stored in heat accumulator 17 is just enough for heating the entire air during the switching procedure to the temperature of the heated air recovered from a regenerator. Via conduit 20, most of the heated air flows into conduit 19 and thus to the combustion zone, and the remainder, e.g. about 1 to 10%, preferably 3 to 5% is passed via valve 7 into the regenerator 1 which heretofore had been heated by the flue gases and thus is still filled with residual flue gases. By means of the air entering via valve 7, the residual flue gas, which heretofore (i.e., in conventional systems) had been returned to the combustion zone when reversing from flue gas operation to air operation, is flushed out of regenerator 1. This flue gas-air mixture is then discharged from regenerator 1 via the still opened valve 12 in the flue gas outlet and flows to the stack. After flushing out the flue gas, the valves 12 and 10 are closed while valves 11 and 13 are opened. The air now flows in its entirety from conduit 5 into regenerator 1 and absorbs the heat stored therein. After exiting from regenerator 1, the major portion of the air is conducted via conduit 19 to the combustion zone and a minor portion of the air is returned to the heat accumulator 17 to heat same.

This switching operation normally lasts a few seconds, e.g., 1 to 10 seconds, usually about 3 seconds. All valves are automatically switched in the correct timing sequence. In this way, the rate of air flow through conduit 19 to the combustion zone is always substantially uniform and the air is of a uniform quality, specifically free from a content of flue gas.

The excess air, i.e. the difference between the quantity of air flowing in conduit 5 and the amount of air flowing in conduit 19, serves either to heat up the heat accumulator 17 between two switching procedures, or to flush out a regenerator during a switching procedure. This excess air is then discharged into the stack. In this way, the combustion zone, e.g., of a boiler, is practically unaffected by the reversal of the directions of flow in the switching of regenerators.

If regenerator 2 has been heated and regenerator 1 has been cooled, reversal takes place analogously. This means that valves 7, 8, 11 and 13 are closed and valves 6, 9, 10 and 12 are opened. Once regenerator 2 has been purged, the valves 14 and 10 are closed and the valves 15 and 11 are opened, and so on.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight. 1,000,000 Nm$^3$/h flue gas at a temperature of 150° C. are introduced via conduit 3 into regenerator 1 by way of valve 6 and cooled down to about 60° C. 1,050,000 Nm³/h air having ambient temperature (20° C.) are conducted into regenerator 2 through conduit 5 via valve 15. The air is heated up to 130° C. 950,000 Nm³/h heated air is fed into the combustion zone via valve 9 and conduit 19. The excess proportion of hot air (100,000 Nm³/h) is conducted via conduit 20 to the heat accumulator 17. The air, cooled in heat accumulator 17, leaves the latter via conduit 18 through valve 11 and enters the flue gas conduit 4 leading to the stack.

After switchover is effected flue gas flows through regenerator 2 to the stack. 1,050,000 Nm³/h air of ambient temperature, for the duration of the switchover procedure, is conducted via conduit 16 and valve 10 to the heat accumulator. The air is heated to 130° C. 100,000 Nm³/h air is passed via valve 7 into regenerator 1 which is filled with residual flue gases. After flushing out the flue gas, the valves 12 and 10 are closed while valves 11 and 13 are opened. The air now flows in its entirety (1,050,000 Nm³/h) from conduit 5 into regenerator 1 and absorbs the heat stored therein. After exiting from regenerator 1, the 950,000 Nm³/h air are conducted to the combustion zone and 100,000 Nm³/h air is returned to the heat accumulator 17 to heat the same. The switching operation lasts about 3 seconds.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

I claim:

1. In a method for the switching of two interchangeable and reversible regenerators, one of which has been heated by a hot fluid and the other of which has been cooled by a cold fluid, the improvement which comprises the steps of interrupting the feed of the cold fluid to the cooled regenerator and the feed of the hot fluid to the heated regenerator; switching valves so as to introduce the hot fluid into the cooled regenerator while simultaneously passing the cold fluid through a heat accumulator connected in parallel with the regenerators so as to obtain heated fluid; passing a minor portion of said heated fluid into the heated regenerator to flush out residual hot fluid therefrom; and subsequently passing the cold fluid in its entirety through the heated regenerator, said heat accumulator being contacted throughout said method by only the cold fluid in either its heated or ambient state.

2. A method according to claim 1, wherein the heat accumulator is heated up by a partial stream of the originally cold fluid that was heated in the regenerator.

3. A method according to claim 1, wherein the portion of the fluid heated in the heat accumulator and serving to flush out the regenerator is introduced at the warm regenerator end and is withdrawn at the cold end thereof via a conduit used for withdrawing the cooled originally hot fluid from the regenerator.

4. A method according to claim 1, wherein the thermal capacity of the heat accumulator is just sufficient for heating the cold fluid, during the switching process, to the temperature exhibited by the heated cold fluid after flowing through a regenerator.

5. A method according to claim 1, wherein the cold fluid is air and the hot fluid is combustion gas, and further comprising passing a major portion of resultant heated air withdrawn from the heat accumulator to a combustion zone and then passing a major portion of heated air withdrawn from the regenerator to a combustion zone, both of said major portions being of substantially the same flow rate and composition whereby the combustion process in the combustion is substantially unaffected by the switching of the regenerators.

6. A method according to claim 5, wherein the switching of the regenerators occurs in about three seconds.

7. A method according to claim 5, wherein the switching of the regenerators occurs in about 1 to 10 seconds.

8. A method according to claim 2, wherein about 1-10% of the entire heated air is passed to said heat accumulator to heat up the latter.

9. A method according to claim 2, wherein about 3-5% of the entire heated air is passed to said heat accumulator to heat up the latter.

10. A method according to claim 1, wherein said heat accumulator is substantially smaller than said regenerators.

* * * * *